United States Patent [19]

Egger et al.

[11] 4,309,164

[45] Jan. 5, 1982

[54] WORKING MACHINE, PARTICULARY AN INJECTION-MOLDING MACHINE HAVING A MOTIVE SYSTEM WHICH PRODUCES A SEQUENCE OF REGULARLY RECURRENT INERTIA FORCES

[75] Inventors: Caspar Egger, Glarus; Rudolf Krebser, Schübelbach, both of Switzerland

[73] Assignee: Netstal-Maschinen AG, Switzerland

[21] Appl. No.: 152,124

[22] Filed: May 21, 1980

[30] Foreign Application Priority Data

May 31, 1979 [CH] Switzerland .................. 5063/79

[51] Int. Cl.³ .............................................. B29F 1/00
[52] U.S. Cl. ...................................... 425/589; 425/451
[58] Field of Search ...................... 425/589, 451, 214

[56] References Cited

U.S. PATENT DOCUMENTS 4,172,872  10/1979  Nagai ........................... 425/589 X

*Primary Examiner*—Thomas P. Pavelko
*Attorney, Agent, or Firm*—McGlew and Tuttle

[57] ABSTRACT

A working machine, particularly an injection-molding machine includes two separable mold parts which are closed together in at least one direction and an injection device for the mold which produce inertial forces and which are mounted for movement on a fixed support in at least one direction. The device includes an actuator also mounted on the support having a movable actuator part connected to the machine part which is displaceable in the direction of the inertial force.

4 Claims, 1 Drawing Figure

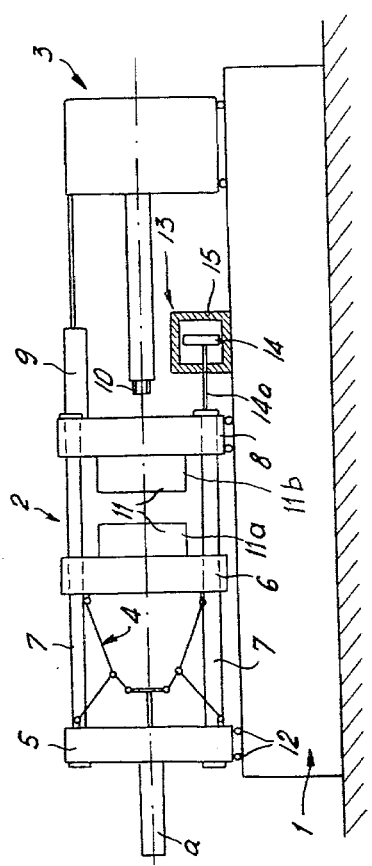

WORKING MACHINE, PARTICULARY AN INJECTION-MOLDING MACHINE HAVING A MOTIVE SYSTEM WHICH PRODUCES A SEQUENCE OF REGULARLY RECURRENT INERTIA FORCES

FIELD AND BACKGROUND OF THE INVENTION

This invention relates in general to a device which includes a machine part which is mounted on a support for movement in at least one direction and produces a regularly recurring inertia force and an actuator which is mounted on a support and has one moving actuator part connected to the machine part and is displaceable in the direction of the inertia force.

In machines of this kind, particularly injection-molding machines for plastics, but also in high-speed presses or the like, relatively strong oscillatory insertia forces are produced by the intial acceleration and braking retardation of the moving parts, such as molding plates, pistons, lever gear, etc., which forces are transferred to the support and cause a correspondingly strong vibration or jolting of the entire machine. Depending on the characteristics of the moving mechanism or on the adjusted speeds, the acceleration and retardation forces may compensate each other or have a positive or negative resultant in the direction of motion. In the last mentioned case, the entire machine starts to creep on the floor in the direction of the resultant of the inertia force. If the machine is firmly screwed to the floor, the acting forces may cause cracks in the support or in the bed, and noise is conducted through the bed into the building.

To eliminate such undesirable phenomena, it is known to accelerate additional masses in the direction opposite to the motion of parts producing inertia forces. This may partly or completely compensate for the inertia forces. A common drawback of such arrangements, however, is that they are relatively complicated, expensive and bulky. In addition, they increase not only the total weight of the machine but also the power requirements. In many instances, this additional equipment also makes the access to the machine parts more difficult.

SUMMARY OF THE INVENTION

Therefore, the main objective of the invention is to keep the inertia forces away from the support, and thus from the bed. To this end, the invention provides that the entirety of moving parts, i.e. the motive system, is designed as a unit which is mounted for displacement in the direction of the inertia forces.

While accelerating the moving parts of the motive system in one direction, the unit moves on the support through a definite distance in the opposite direction, while upon retardation of the parts, the unit moves through a definite distance in the initial direction. If the accelerating and retarding forces are equal to each other, the unit performs a reciprocating motion about a central position and no forces are transmitted to the support or the bed.

In many instances, however, the accelerating and retarding forces are not equal to each other so that the displacements of the unit are correspondingly different, i.e. the unit travels on the support in one or the other direction, in accordance with the differential displacement. This problem is solved, in accordance with the invention, by providing an actuator acting on the unit in order to periodically compensate for the differential displacement caused by the unequal magnitude of the inertia forces. This actuator, operated electromagnetically, hydraulically, pneumatically, or through a spring, for example, ensures that at the start of each acceleration or retardation cycle, the unit occupies a zero position, so that a migration of the unit in one or the other direction is prevented. The unit may be returned to its zero position during a standsill period of the moving parts, or during a period in which the inertia forces are small, zero, or act in the return direction. It is possible of course, to allow the actuator to operate, at least partly, while still a larger inertia force produces its effect on the unit, so that when the actuator damps the motion by taking up a part of this force. Incidentally, this makes sense only if the inertia forces to be taken up are relatively small, for example, if only small differential inertia forces occur.

Accordingly, it is an object of the invention to provide a working machine, particularly in an injection molding machine which comprises a support with a machine part mounted on the support for movement in at least one direction which produces regularly recurring inertial force and an actuator mounted on the support and having a moving actuator part connected to the machine part which is displaceable in the direction of the inertia force.

A further object of the invention is to provide a working machine and particularly an injection molding machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing in which a preferred embodiment of the invention is illustrated.

BRIEF DESCRIPTION OF THE DRAWING

The only FIGURE of the drawing is a side elevational view partly in section of an injection molding machine in which the motor system produces a sequence of regularly recurrent inertia forces.

DESCRIPTION OF THE PREFERRED EMBODIMENT

Referring to the drawing, in particular the invention embodied therein comprises a working machine such as an injection-molding device which includes a mold 11 having two closable mold parts 11a and 11b with an operating mechanism which is mounted for movement on a support 1. In addition, the injection device includes an injection 3 which is also mounted on a support 1 for movement under the control of a piston and cylinder system 9 which is connected thereto for the purpose of shifting an injection nozzle 10 in respect to the mold 11.

The FIGURE shows an injection molding machine for plastics, mounted on a machine support 1. A motive system of the machine, comprising a mold-locking mechanism 2 and an injection device 3, is supported on the support. The mold locking mechanism 2 includes, as usual, a toggle linkage 4 bearing against a backup plate 5 and acting on a movable mold-carrying plate 6 which is guided on rods 7. Rods 7 connect backup plate 5 to a fixed mold-supporting plate 8. Injection device 3 is connected to the fixed mold-supporting plate 8 by a fluid pressure operated piston-cylinder system 9, so that injection nozzle 10 of the injection device 3 (shown in its retracted position relative to the mold) can firmly by applied to the gate of mold 11 after the parts 11a and 11b are closed.

The entire motive system of the machine formed by the locking mechanism 2 and injection device 3 is mounted as a unit on support 1, for movement along the working axis a of the machine (rollers 12 are indicated in the FIGURE for this purpose).

The inertia forces produced during operation of the machine in one or the other direction of working axis a cause in every instance a corresponding displacement of the unit 2,3 in support 1, without any force being transmitted to the support in either direction. Since the inertia forces produced by accelerating or retarding the moving parts of the unit 2,3 are very seldom equal to each other in the two axial directions, an actuator 13 is provided which, in the present example, is designed as a hydraulic mechanism or fluid pressure operating piston and cylinder combination. A piston rod 14a of a piston 14 of this mechanism 13 extending parallel to the machine axis a, is secured to the fixed mold-supporting plate 8, while the cylinder 15 of the mechanism is fixed to support 1. By adequately loading piston 14 of the actuator, unit 2,3 can be displaced in every cycle through the difference of displacements caused by the inertia forces in both directions, so that the result is an oscillatory motion of the entire unit about a zero position. If, for example, the inertia forces produced during acceleration of the moving parts effect a displacement of unit 2,3 in one direction through an axial distance x, and the inertia forces produced during retardation effect in the opposite direction a displacement through a distance y, actuator 13 effects the differential displacement. Advantageously, the displacement through the differential distance is effected during a standstill period of the moving parts of the motive system; however, the displacement may also be superposed to the smaller displacement caused by the inertia forces.

This makes it possible in practice to keep the unavoidable inertia forces of the motive system of the machine completely away from the support. It is to be noted, however, that with very small unequalities of inertia forces acting in the two opposite directions, the actuator may certainly also be designed to transfer such small differential forces, with or without damping, to the support; in such instances, there would be no need for correcting the displacement, since the predominant remaining part of the inertia forces would be compensated by the mobility of the unit itself.

The described principle is applicable to any working machine in which the motive system produces inertia forces acting periodically and at a fast rate in at least one direction, and can be assembled to a unit. It should be noted in addition, that the design may be such that intertia forces are produced acting only or primarily in one direction, so that the differential displacement is relatively large. Since in machines of this kind, the displacements of the motive system in one or the other direction are of the order of magnitude of some centimeters, such displacements in one direction only can easily completely be compensated by an actuator acting in the opposite direction. It must be kept in mind in this connection that the mentioned mobility of its own of the motive system, decoupling the system from the support (with or without a displacement correction), is by no means limited to machines with horizontally acting inertia forces. By providing a hydraulic weight compensating device, for example, the principle may also be applied to machines in which the intertia forces are effective vertically.

Although roller guides are indicated in the drawing between the motive system and the support, it is particularly advantageous to provide slide guideways for this purpose.

While a specific embodiment of the invention has been shown and described in detail to illustrate the application of the principles of the invention, it will be understood that the invention may be embodied otherwise without departing from such principles.

What is claimed is:

1. A working machine, particularly an injection molding machine, comprising a support, a machine part mounted on said support for movement relative thereto in at least one direction whereby the movement of said machine part produces a regularly recurring inertia force, an actuator mounted on said support and having a moving actuator part connected to said machine part and being displaceable in a direction of the inertia force wherein said machine part includes a fixed mold part and a movable mold part with means for moving said movable mold part toward and away from said fixed mold part, said movement of said movable mold part producing an inertia force in one direction, said actuator being connected to said fixed mold part to produce a force on the mold part in a direction opposite to but equal in magnitude to the inertia force.

2. A working machine according to claim 1 including roller guide means on said support for supporting said injection molding machine comprising said movable and fixed mold parts for displacement thereon, said actuator comprising a fluid pressure operated piston and cylinder combination including a piston connected to said injection molding system and a cylinder connected to said support.

3. An injection molding machine comprising a support; a mold locking mechanism including a backup plate movably mounted on said support for movement relative thereto, a mold supporting plate movably mounted on said support for movement relative thereto, a guide rod carried by said backup plate connected to said mold supporting plate, a mold carrying plate mounted on said guide rod and movable toward and away from said mold supporting plate, and link means mounted to said backup plate and said mold carrying plate to move said mold carrying plate along said guijde rod relative to said mold supporting plate; an injection device movably mounted on said support; piston cylinder means operatively interconnecting said injection device and said mold locking mechanism; said injection device and said mold locking device being movable along a common axis as a unit relative to said support responsive to a sequence of radially recurring inertia forces, actuated by the movement of said locking mechanism, for movement in the direction of the inertia forces; and actuator means connected to said support and engaged to said mold locking mechanism for moving said unit through a distance to a zero position, said distance being equal to the distance of the movement caused by said inertia forces.

4. An injection molding machine as set forth in claim 3, wherein said actuator means comprises a fluid pressure operated piston and cylinder combination including a piston connected to said mold locking mechanism and a cylinder connected to said support.

* * * * *